United States Patent Office 2,950,403
Patented Aug. 23, 1960

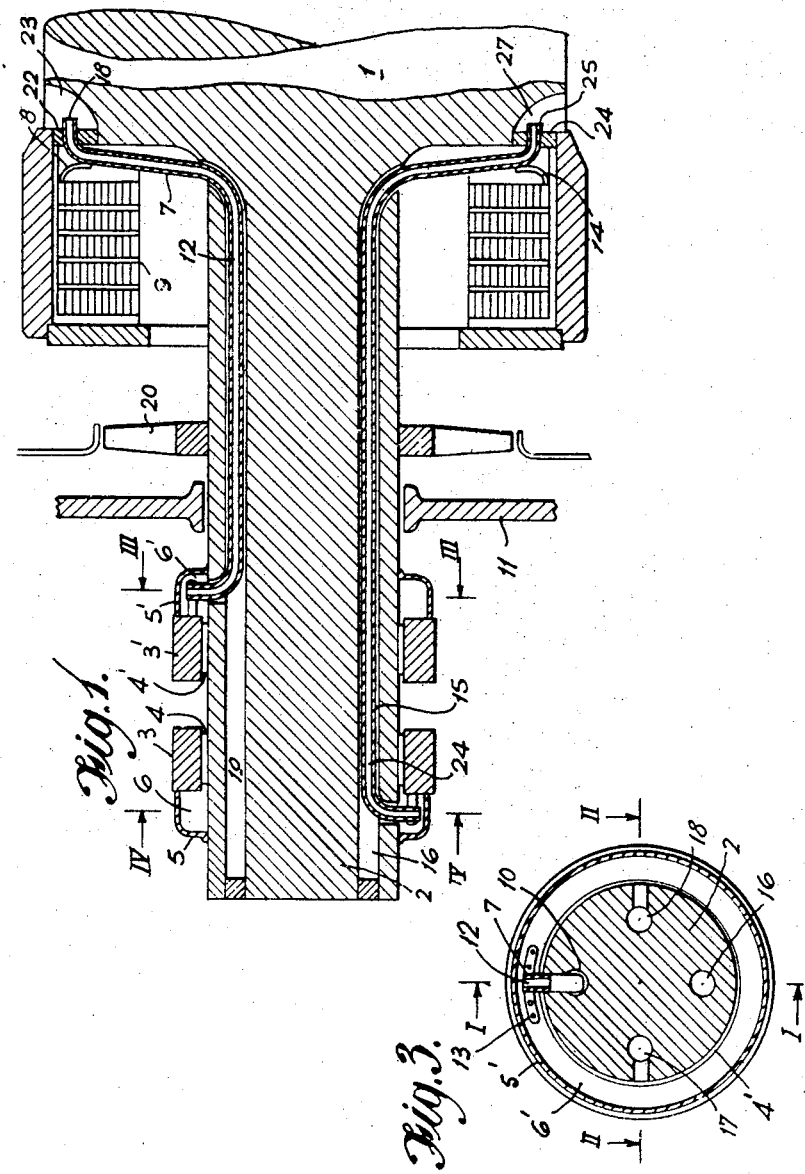

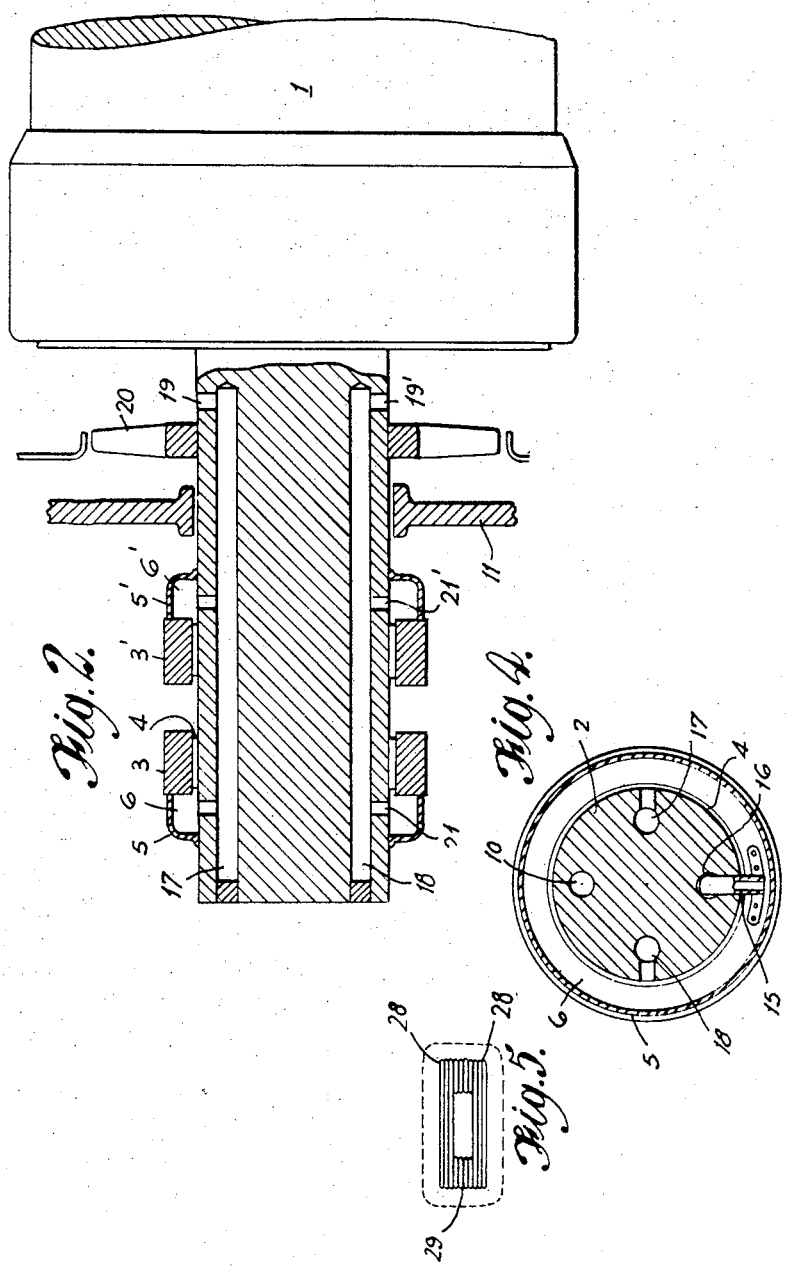

2,950,403

ELECTRICAL TURBO GENERATORS

William Norman Kilner, Hale, and Joseph Tudge, Walkden, Manchester, England, assignors to Metropolitan-Vickers Electrical Company Limited, London, England, a British company Filed Sept. 16, 1957, Ser. No. 684,289

4 Claims. (Cl. 310—232)

This invention relates to electrical turbo generators and has an important application in machines in which provision is made for gas cooling of the rotor.

The requirements of turbo alternators have recently tended towards increased outputs and since the physical dimensions of these machines cannot, in many cases, be conveniently increased it has been necessary to increase the current loading on the conductors.

In the case of rotors, increase in the current loading of the conductors means increased current through the collector rings and at the same time increased current in the leads connecting the collector rings with the rotor winding. As the collector rings are located outside the casing of the machine increasing their current carrying capacity does not present any undue difficulty. However, as the leads between the collector rings and the rotor winding rotate with the rotor they must be constrained radially and, moreover, they have to pass between the collector rings outside the casing and the rotor winding within the casing, which in the case of hydrogen cooled machines, forms a gas seal with the shaft. In view of this it has been normal practice to pass the leads along bores within the actual shaft. It follows, however, that with such constructions the current density is liable to be limited by the temperature rise in the leads.

According to the present invention a turbo generator having a sealed casing and a rotor and electrical collector rings mounted on the rotor shaft and located outside the casing, has electrical leads connecting the collector rings with the rotor winding, each of which leads comprises a hollow conductor forming an internal longitudinal passage for cooling gas extending between a position adjacent an external collector ring and the rotor periphery.

Preferably annular chambers extend around the shaft adjacent each collector ring and feed cooling gas to pass along the passages in the leads and discharge at the rotor periphery.

Preferably the annular inlet chambers are fed from the end of the shaft through axial ducts in the shaft.

Where there is more than one collector ring, as will normally be the case, the leads between the collector rings and rotor winding may be angularly spaced about the axis of the rotor and similarly the inlet passages to the inlet chambers may also be suitably spaced. The conductor leads may conveniently be formed of superimposed conductor straps whereof the top and bottom straps extend the full width of the conductor but some, at least, of the intermediate straps are interrupted to form internal passages.

In order that the invention may be more clearly understood reference will now be made to the accompanying drawing, in which:

Fig. 1 is a longitudinal view of the end of a rotor taken as a section on the line I—I of Fig. 3.

Fig. 2 is a similar view but as a part section on the line II—II of Fig. 3.

Fig. 3 is a section on the line III—III of Fig. 1.

Fig. 4 is a section on the line IV—IV of Fig. 1, and

Fig. 5 is a detail sectional view to an enlarged scale of a conductor.

In the drawing the reference 1 indicates the rotor body and 2 the shaft end. References 3, 3' indicate the two collector rings respectively; these are insulated from the shaft by bushes 4, 4'. Shroud rings 5, 5' form gas tight annular inlet gas chambers 6, 6'. The collector lead 7 electrically connects the collector ring 3' to the first turn 8 of the rotor winding 9. In the arrangement shown in the drawing the lead is located in an axially drilled duct 10 in the shaft end. This is a preferred arrangement in the region of the bearing journal and gas seal provided with the casing 11. Beyond this region the lead could alternatively be accommodated in a milled slot and secured by wedges.

The leads 7 are of a hollow construction forming a central duct 12 the inlet end of which communicates with the annular inlet chamber 6'.

Gas is admitted to the chambers 6 and 6' feeding the collector leads 7 and 15 from axial ducts 17 and 18 which are fed with cooling gas from inside of the machine case through holes 19 preferably on the pressure side of propeller fan 20. The inlet ducts 17 and 18 are connected with the annular chambers 6, 6' through ports 21, 21'.

The inlet end of the lead 7 is electrically and mechanically connected to the ring 3' by a bracket 13 whilst the outlet end 18 is secured in an insulating bushing 22 and, as above mentioned, is electrically connected with a turn 8 of the rotor winding 9. Cooling gas passing along the duct 12 in the lead 7 discharges into the recess 23 which is open to the annular gap between rotor and stator.

The collector ring 3 is similarly connected with a turn 14 at the opposite end of the winding 9 by a similar hollow conductor 15 which extends through a duct 16 in the rotor 2 which duct is, as shown in Figs. 3 and 4, arranged diametrically opposite to the duct 10. The lead 15 has an internal passage 24 and an outlet end 25 which is carried on a bushing 26 and discharges into the recess 27.

Alternatively to the ports 19, space may be provided in the outwardly axially extending parts of the ducts 10 and 16 to carry cooling gas to the chambers 6 and 6', the space being fed by radial ports similar to 19.

It will be understood that the axial ducts 10 and 16 need not necessarily be diametrically opposite but may have any convenient circumferential position, as may also the inlet ducts 17 and 18. Moreover, the pairs of ducts 10 and 16, 17 and 18 need not lie near the circumference of the shaft and may be replaced by two large central ducts near the axis of the shaft or positioned as is convenient.

The large difference in radius between the inlet holes 19 and 19' and the outlets 18, 25 is sufficient, when the machine is rotating, to produce a high pressure differential to force gas through the passages 17 and 24.

Fig. 5 is a cross sectional view of a lead showing how this may be constructed of wide strips 28 spaced apart by two sets of narrow strips 29 so as to form a duct.

What we claim is:

1. A turbo generator having a rotor member on a shaft, a sealed casing surrounding said rotor member and through the end of which one end of the shaft projects, collector rings on the portion of the shaft outside the casing, an annular chamber extending round the shaft adjacent to each of the collector rings and in good thermal contact therewith, ducts extending axially through said shaft, each communicating at one end with one of said annular chambers, hollow electrical conductors lying in said ducts and connecting the collector rings with the rotor winding near the rotor periphery and thereby forming passages for cooling gas extending between said annular chambers and discharge apertures at the periphery of the rotor, and means for introducing cooling gas into the annular chambers.

2. A turbo generator having a rotor member on a shaft, a sealed casing surrounding said rotor member and through the end of which one end of the shaft projects, collector rings on the portion of the shaft outside the casing, an annular chamber extending round the shaft adjacent to each of the collector rings and in good thermal contact therewith, a first series of ducts extending axially through said shaft connecting the annular chambers with the cooling gas within the casing, a second series of ducts extending axially through said shaft, each communicating at one end with one of said annular chambers, and hollow electrical conductors lying in said second series of ducts and connecting the collector rings with the rotor winding near the periphery of the rotor so as to form passages for cooling gas extending along said first series of ducts between the casing and the annular chambers and extending within said conductors between the annular chambers and discharge apertures at the periphery of the rotor.

3. A turbo generator having a rotor member on a shaft, a sealed casing surrounding said rotor member and through the end of which one end of the shaft projects, collector rings on the portion of the shaft outside the casing, an annular chamber extending round the shaft adjacent to each of the collector rings and in good thermal contact therewith, ducts extending axially through said shaft each communicating with one of the annular chambers and also with an aperture in the portion of the surface of said shaft located outside the casing and hollow electrical conductors lying in said ducts and connecting the collector rings with the rotor winding near the periphery of the rotor so as to form passages for cooling gas extending along the ducts from outside the casing to the annular chambers and extending within the conductors between the annular chambers and discharge apertures at the periphery of the rotor.

4. In an electrical generator assembly wherein a rotor shaft projects through a sealed casing, axially spaced collector rings mounted on said shaft externally of the casing, a winding on the rotor disposed within the casing, means providing a cooling chamber for each collector ring in good thermal contact therewith, axially directed ducts in said rotor shaft extending from said cooling chambers within said casing, and hollow electrical conductors extending along said ducts, said conductors each being electrically connected to respective collector rings at their outer ends and to respective rotor winding terminals within said casing at their inner ends, and said conductors each having open ends disposed respectively within one of said chambers and within said casing.

References Cited in the file of this patent

FOREIGN PATENTS 938,431     Germany _____ Feb. 2, 1956